(12) United States Patent
Patil et al.

(10) Patent No.: US 9,706,420 B2
(45) Date of Patent: *Jul. 11, 2017

(54) NODE QUERY IN AD HOC HOME MESH NETWORK

(71) Applicants: SONY CORPORATION, Tokyo (JP); SONY ELECTRONICS INC., Park Ridge, NJ (US)

(72) Inventors: Abhishek P. Patil, San Diego, CA (US); Xiangpeng Jing, Scotch Plains, NJ (US); Aixin Liu, San Diego, CA (US); Djung N. Nguyen, San Diego, CA (US)

(73) Assignees: SONY CORPORATION, Tokyo (JP); SONY ELECTRONICS INC., Park Ridge, NJ (US)

(*) Notice: Subject to any disclaimer, the term of this patent is extended or adjusted under 35 U.S.C. 154(b) by 97 days.

This patent is subject to a terminal disclaimer.

(21) Appl. No.: 14/274,040

(22) Filed: May 9, 2014

(65) Prior Publication Data

US 2014/0247752 A1 Sep. 4, 2014

Related U.S. Application Data

(63) Continuation of application No. 12/402,439, filed on Mar. 11, 2009, now Pat. No. 8,780,762.

(51) Int. Cl.
| | | |
|---|---|---|
| *H04W 24/08* | (2009.01) | |
| *H04W 40/24* | (2009.01) | |
| *H04L 12/24* | (2006.01) | |
| *H04L 12/26* | (2006.01) | |
| *H04W 12/02* | (2009.01) | |
| *H04W 8/22* | (2009.01) | |
| *H04W 8/24* | (2009.01) | |
| *H04W 84/18* | (2009.01) | |

(52) U.S. Cl.
CPC ............ *H04W 24/08* (2013.01); *H04L 41/08* (2013.01); *H04L 41/085* (2013.01); *H04L 41/0853* (2013.01); *H04L 41/12* (2013.01); *H04L 43/00* (2013.01); *H04L 43/04* (2013.01); *H04L 43/10* (2013.01); *H04L 43/103* (2013.01); *H04W 40/246* (2013.01); *H04W 8/22* (2013.01); *H04W 8/24* (2013.01); *H04W 12/02* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,453,977 A | * | 9/1995 | Flammer et al. | 370/254 |
| 5,838,472 A | * | 11/1998 | Welch et al. | 398/151 |
| 6,996,627 B1 | * | 2/2006 | Carden | 709/237 |
| 7,953,083 B1 | * | 5/2011 | Evans | H04L 67/104 |
| | | | | 370/390 |

(Continued)

*Primary Examiner* — Peter Chau
(74) *Attorney, Agent, or Firm* — John L. Rogitz

(57) ABSTRACT

An embodiment is a technique to collect network and device information. A request for local information is responded to. The request is sent by a remote node in an ad hoc home mesh network. A first node listed in a local route table is queried for node information of the first node. Querying is expanded to a second node in the ad hoc home mesh network using the node information. The second node is a neighbor of the first node.

15 Claims, 8 Drawing Sheets

(56) References Cited

U.S. PATENT DOCUMENTS

2003/0179742 A1* 9/2003 Ogier et al. .................. 370/351
2005/0086295 A1* 4/2005 Cunningham et al. ....... 709/203
2009/0022090 A1* 1/2009 Ayoub et al. ................. 370/328
2010/0046395 A1* 2/2010 Sivaramakrishna Iyer
 et al. ............................ 370/254

* cited by examiner

NODE QUERY IN AD HOC HOME MESH NETWORK

TECHNICAL FIELD

The presently disclosed embodiments are directed to the field of wireless communication, and more specifically, to mesh network.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. In the ad hoc mode, it is difficult to gather details about the network such as network failures, dead spots, or connectivity status. Existing techniques typically employ a broadcast-based network-wide flooding model. A major disadvantage of these techniques is the limit on the number of nodes that can be supported. In addition, the broadcasting nature tends to cause disruption in network communication.

SUMMARY

One disclosed feature of the embodiments is a method and apparatus to collect network information. A request for local information is responded to. The request is sent by a remote node in an ad hoc home mesh network. A first node listed in a local route table is queried for node information of the first node. Querying is expanded to a second node in the ad hoc home mesh network using the node information. The second node is a neighbor of the first node.

BRIEF DESCRIPTION OF THE DRAWINGS

Embodiments may best be understood by referring to the following description and accompanying drawings that are used to illustrate embodiments. In the drawings.

DETAILED DESCRIPTION

One disclosed feature of the embodiments is a technique to collect network and device information. A request for local information is responded to. The request is sent by a remote node in an ad hoc home mesh network. A first node listed in a local route table is queried for node information of the first node. Querying is expanded to a second node in the ad hoc home mesh network using the node information. The second node is a neighbor of the first node. By expanding the query throughout the network, any remote node can learn about the other nodes' local information and gain knowledge of the global network topology information.

In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. The beginning of a flowchart may be indicated by a START label. The end of a flowchart may be indicated by an END label. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
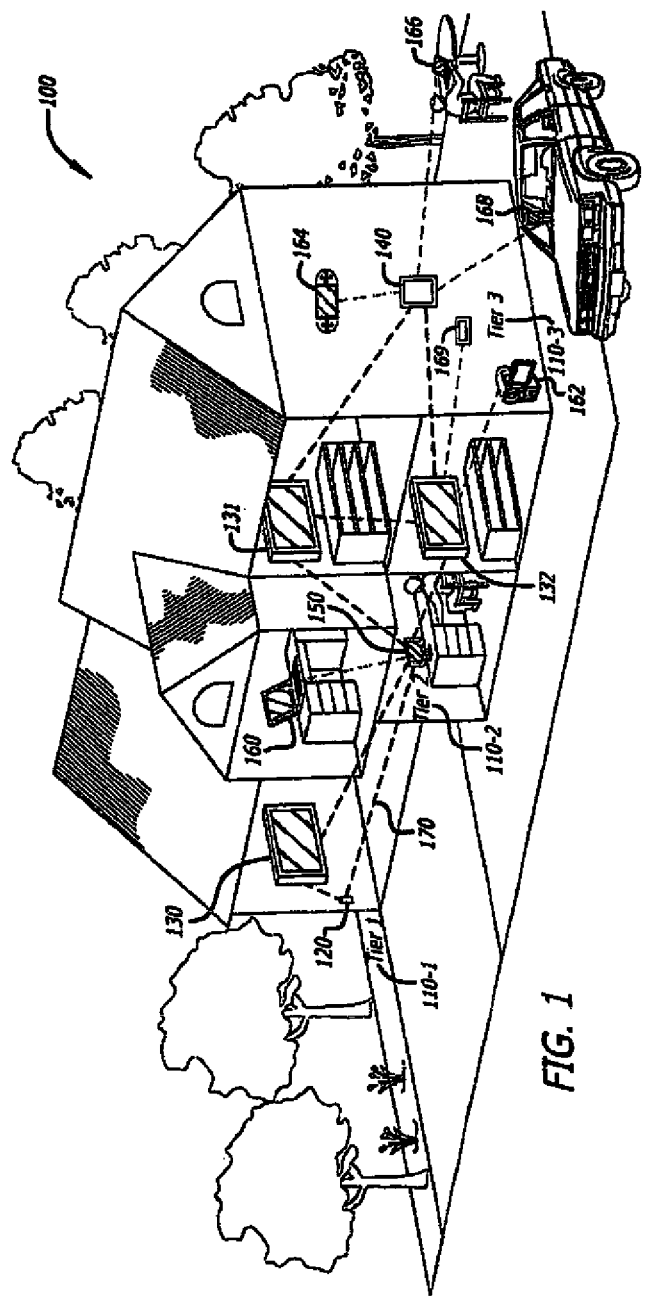
FIG. 1 is a diagram illustrating a system of a three-tier wireless ad hoc home mesh network (WHMN) according to one embodiment.

FIG. 1 is a diagram illustrating a system of a three-tier wireless ad hoc home mesh network (WHMN) according to one embodiment.

Multi-tier wireless home mesh network 100 (hereinafter referred to as "WHM network" or "WHMN" 100) comprises a collection of nodes that operate as a decentralized, wireless home mesh network with multiple (N≥1) sub-networks $110_1$-$110_N$ (hereinafter singularly referred to as "tiers") that are responsible for different functions within WHM network 100. Hence, mostly every node of WHM network 100 is configured to forward data to other nodes and is assigned to a specific tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of WHM network 100 features a hierarchical architecture comprising three (3) tiers that are assigned based on the capabilities of the node. A first tier ("tier 1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WHM network 100 in order to provide multiple communication paths to external network(s).

A second tier ("tier 2") $110_2$ of WHM network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronic device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary electronics devices are not subject to power constraints that are usually present in mobile nodes where power usage is minimized to extend battery life between recharges.

A third tier ("tier 3") $110_3$ of WHM network 100 may include links between a wireless node belonging to second tier $110_2$ and one or more mobile nodes (160, 162, 164, 166, 168 & 169). A "mobile node" may include any battery powered electronics device with wireless connectivity including, but is not limited to a laptop computer, handheld device (e.g., personal digital assistant, ultra mobile device, cellular phone, portable media player, wireless camera, remote control, etc.) or any non-stationary consumer electronics devices. Since mobile nodes normally have resource constraints (e.g., limited power supplies, limited processing speeds, limited memory, etc.), third tier $110_3$ may provide reduced network services. In one embodiment, mobile nodes of WHM network 100 may act as a slave or child connecting directly to a tier-2 node, which may further limit their functionality within WHM network 100.

Table 1 summarizes a multi-tier, wireless home mesh network architecture, categorization by potential network characteristics, tier node descriptions and traffic type that is prevalent over WHM network 100.

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, . . . |
| | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
| | Tier 2 | Fixed location, power-sufficient (TX power 100 mW-1 W) | TV, desktop computer, gaming console (e.g. PS3), etc. |
| | Tier 3 | Mobile, power-limited (TX power 1-100 mW) | Laptop, mobile phone, portable media player, wireless camera, remote |
| Traffic | HD video streaming | ~30 Mbps compressed | 1080p/i, 720p/i, 480p/i quality HD videos |
| | SD Video/ Audio streaming | ~100k-1 Mbps video, 32k-256 kbps audio | Internet video clip (e.g. YouTube ®), webcam output, mp3 audio, voice |
| | Data | Bursty transmission, ~20 Mbps for certain user satisfaction | http type data (web browsing) |

As indicated by Table 1, WHM network 100 is distinct from conventional mesh-network solutions because WHM network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the WHM network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

Figure 2:
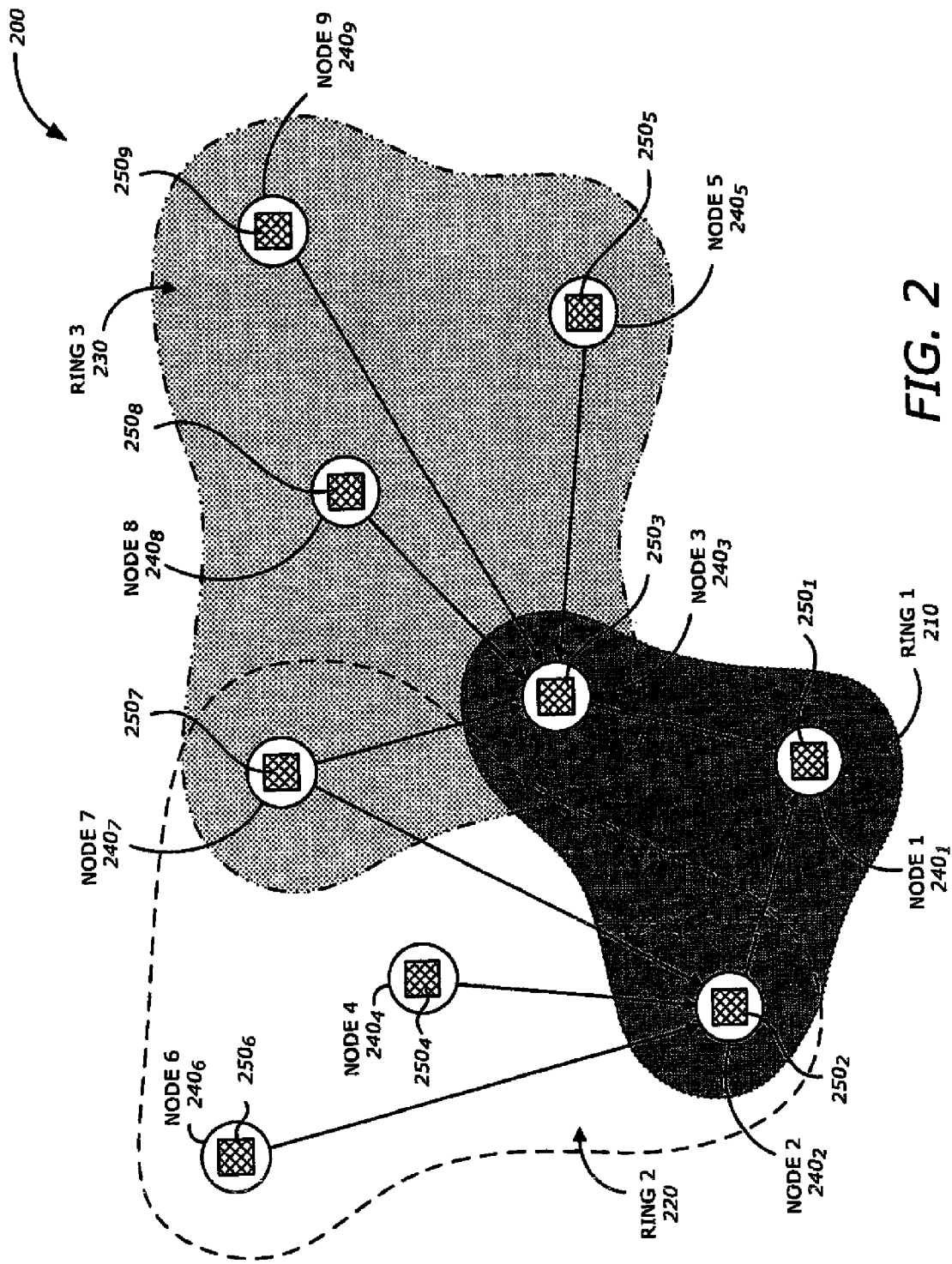
FIG. 2 is a diagram illustrating a node query topology within a WHMN according to one embodiment.

FIG. 2 is a diagram illustrating a node query topology 200 within a WHMN according to one embodiment. The node query topology 200 illustrates the connectivity geometry of the nodes in the WHMN 100. The node query topology 200 includes three rings: ring 1 210, ring 2 220 and ring 3 230 encompassing nodes j $240_j$'s where j=1, . . . , 9. The nodes $240_j$'s are the nodes in the mesh network as described in FIG. 1. They are connected via wireless connectivity. The use of three rings and nine nodes is only for illustrative purposes. It is contemplated that the topology 200 may include more or less than the above rings and nodes.

Each of the three rings 210, 220, and 230 includes a ring center node and nodes in the network that are neighbor nodes as seen or recognized by the ring center node. The ring center node does not have to be at the exact geometrical center of the corresponding ring. A node that is a neighbor node of a ring center node in a ring may be the ring center node of another ring. In addition, a node may be a neighbor node of more than one ring center nodes. For example, the ring center nodes for the three rings 210, 220, and 230 are nodes $240_1$, $240_2$, and $240_3$, respectively. For ring 210, the neighbor nodes of the ring center node $240_1$ include nodes $240_2$ and $240_3$. For ring 220, the neighbor nodes of the ring center node $240_2$ include nodes $240_4$, $240_6$ and $240_7$. For ring 230, the neighbor nodes of the ring center node $240_3$ include nodes $240_5$, $240_7$, $240_8$, and $240_9$.

Each of the nodes $240_j$'s (j=1, . . . , 9) may include a network responder and collector $250_j$. For brevity, a node $240_j$ or a network responder and collector $250_j$ may be referred to as 240 or 250, respectively, without the subscript. The network responder and collector $250_j$ performs information collection for the node 240j. The information collection includes collecting the information regarding the nodes and the network. With respect to the node $240_j$, the components of the node $240j$ may be referred to as local components and a node $240_k$ (where k≠j) may be referred to as a remote node.

As the topology 200 changes due to network dynamics, traffic, conditions and/or the dynamics or mobility of the nodes $240_j$'s, the geometry, pattern, or the membership of the rings may also be changed. Each of the nodes $240_j$'s therefore typically updates its components and its view regarding the network periodically such that the information contained in the nodes $240_j$'s reflects a reasonable consistent global view of the network at a reasonable rate that is relevant to its particular needs or applications.

The nodes $240_j$'s participate in the network information collection by employing a query protocol that is based on unicast transmissions. The use of unicast transmissions avoids flooding the network with query and reply messages. Every node $240_j$ is capable of responding to requests sent by any other nodes in the network. In addition, any node $240_j$, referred to as a query node, that needs to query another node is equipped with a query functionality that allows it to send a unicast query to a node in its local route table. Upon receiving the reply message to the query, the query node may also expand its query to nodes outside its own local route table by analyzing the node information as contained in the reply message. The query expansion may be repeatedly performed on nodes that are beyond the current ring of the query node. The frequency, rate, or periodicity of the query or query expansion may depend on the application as invoked by the query node and may be fixed or adjustable.

As an example, suppose node $240_1$ is a query node. Nodes $240_2$ and $240_3$ are its neighbor nodes in the ring 210. Therefore, they are listed on its local route table. As part of its normal functions in the query protocol, it responds to any request for its information when the request arrives. As a query node, it may wish to obtain details or information on the network or on other nodes. It first sends a unicast query message to each of the nodes $240_2$ and $240_3$. Nodes $240_2$ and $240_3$ may not be query nodes. However, since they are participants in the network query protocol, they respond to the request from node $240_1$ by sending their reply message containing the node information to node $240_1$. Part of the node information is the local route table or a list of the neighbor nodes. When node $240_1$ receives the reply message from, say, node $240_2$, it analyzes the node information of node $240_2$. Node $240_1$ then discovers that nodes $240_4$, $240_6$, and $240_7$ are the neighbor nodes of node $240_2$. Accordingly, node $240_1$ expands its query to these nodes by sending unicast query messages to them. Subsequently, when node $240_1$ receives the reply messages from these nodes $240_4$, $240_6$, and $240_7$, it further analyzes the node information provided by them and further discovers additional nodes. By repeating the query, node $240_1$ is able to expand its knowledge to eventually all nodes in the network. The query ring moves from ring 210 to ring 220 and expands further.

During the analysis of the node information, node $240_1$ is able to identify those nodes that it has already contacted or queried so that it can delete them from its query list to avoid sending duplicated queries. For example, node $240_7$ is listed as the neighbor node of both nodes $240_2$ and $240_3$. Node $240_1$ has sent a query message to node $240_7$. Accordingly, when it discovers that node $240_7$ is also a neighbor node of node $240_3$ in its query to node $240_3$, it will delete node $240_7$ from its query list. Therefore, node $240_7$ does not have to respond to the same query from the same node more than once, preventing network flooding.

The mesh query protocol employed by the nodes $240_j$'s has a number of advantages. It is a fully distributed protocol that may be initiated by any one or more mesh nodes. It may be viewed as a series of expanding rings with the center on the query node. Each new ring represents neighbor nodes in the next (e.g., higher) hop count. It consumes little network resources because the packet size is very small and it is not a broadcast-based protocol. Each message is unicast one-to-one to the intended recipients, avoiding heavy network traffic and collisions from multiple replies as in a broadcast scheme. A broadcast-based scheme tends to have a higher overhead and can also run into issues like the broadcast storm problem if duplicate packets are not controlled. The unicast approach renders the query protocol highly scalable for large scale network deployment.

There may be a number of features of the query mesh protocol that are useful. The frequency of the queries may be adjusted and/or fine tuned from the application that invokes them. For example, a real-time application may have a low tolerance for slow response and therefore may choose to have a high query rate. In addition, the network responder and collector $250_j$ may be implemented as a stand-alone package and may be ported to work on any operating system that runs the mesh network programs. Furthermore, the network responder and collector $250_j$ may provide application program interface (API) calls for other stand-alone applications or services such as the mesh visualizer. Moreover, the use of the optional cryptographic or other security procedures helps protect the message contents from attacks or modifications, intentional or unintentional.

Figure 3:
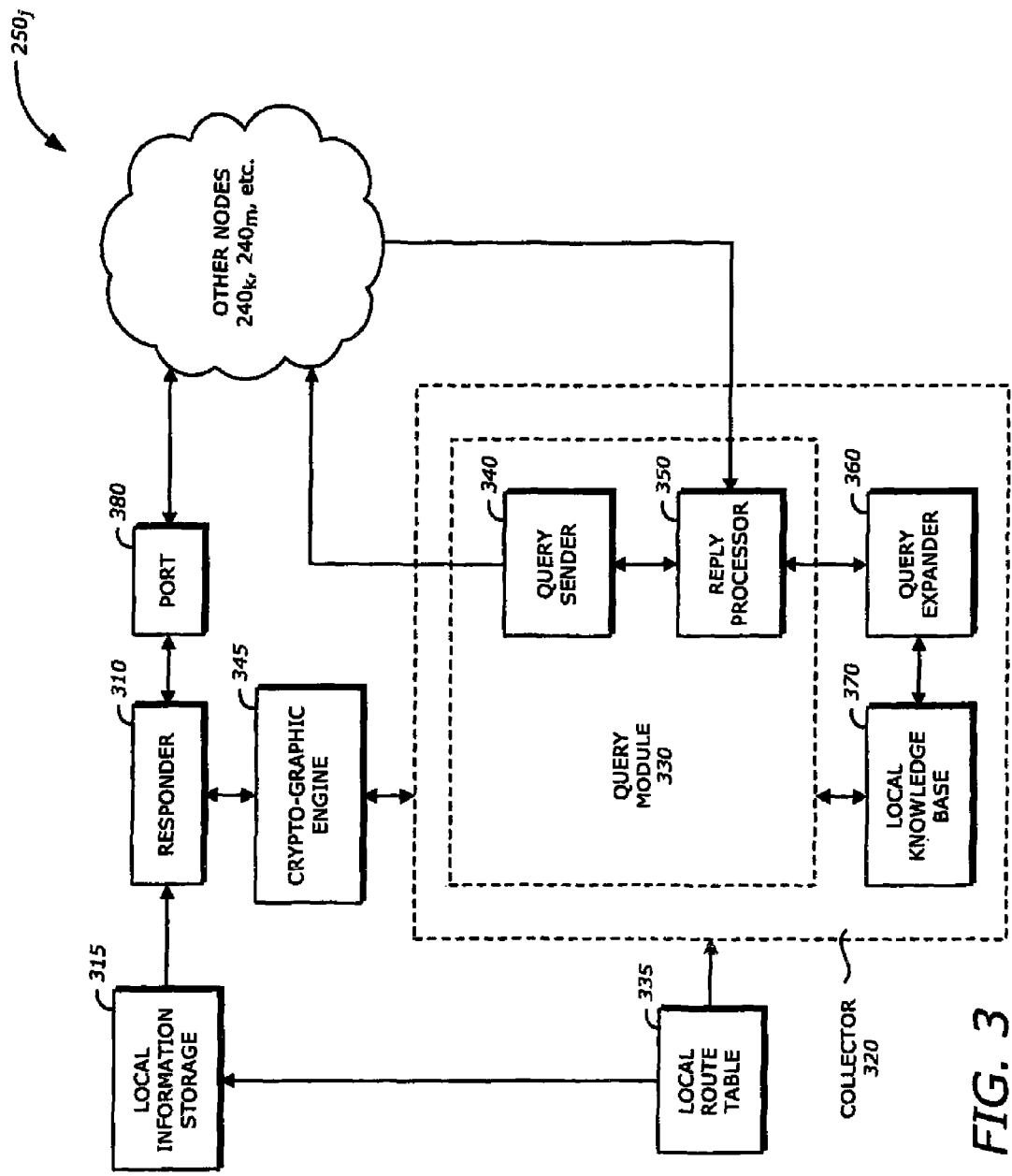
FIG. 3 is a diagram illustrating a network responder and collector according to one embodiment.

FIG. 3 is a diagram illustrating the network responder and collector $250_j$ shown in FIG. 2 according to one embodiment. The network responder and collector $250_j$ includes a responder 310, a collector 320, a local information storage 315, a local route table 335, a cryptographic engine 345, and a port 380. The network responder and collector $250_j$ may include more or less than the above. For example, it may not include the collector 320. Any one of the responder 310, the collector 320, the local information storage 315, the local route table 335, the cryptographic engine 345, and the port 380 may be implemented by hardware, software, firmware, or any combination thereof.

The responder 310 responds to a request for local information. The request is sent by a remote node $250_k$ (FIG. 2) in an ad hoc home mesh network. The local information is associated with the local route table 335. The remote node $250_k$ may be a query node that is collecting or gathering details or information on nodes and network. The responder 310 may exist in all nodes $240_j$'s (FIG. 2) that are participants in the WHMN to exchange network and node information. In one embodiment, the responder 310 may be a module running as a daemon program that listens on the port 380. This daemon program may be started upon boot-up or any appropriate time when the network query protocol is started. The port 380 may be a network port that has wireless connectivity to request transmissions from all nodes $240_j$'s in the network.

Upon receiving a request message for information, the responder 310 may decrypt the request message if the request message is encrypted to obtain the specific request. The decryption may be performed by the cryptographic engine 345 based on a pre-defined cryptographic procedure as established among the nodes in the network. It then retrieves the local node information from the local information storage 315 that corresponds to the request. The local node information storage 315 stores the node information as relevant to the request. It may include at least one of the capabilities, characteristics, or attributes of the node or the network. These capabilities, characteristics, or attributes may include a node routing table such as the local route table 335, a node neighbor table that includes the list of the neighbor nodes, a node identifier (e.g., the node name), a node address (e.g., the Internet Protocol (IP)/MAC address), a node type including the node tier level, a node network capability (e.g., multi-channel capability or QoS capability/priority), a node service capability (e.g., video, voice, or data streaming), a node power attribute (e.g., battery level), and a node communication attribute (e.g., radio type and link qualities).

The responder 310 may then encrypt the local information to form a reply message. The encryption may be performed by the cryptographic engine 345 based on a pre-defined cryptographic procedure. After the reply message is formed, the responder 310 sends the reply message to the remote node $240_k$ via the port 380.

The responder 310 performs its function independently and separately from the collector 320. It may perform its function on a continual basis by continuously listening for request on the port 380. It may listen on the port 380 based on demand or periodically according to the query protocol. The periodicity of the listening and/or the response may be determined in advance or dynamically according to the network configurations, network traffic, or node characteristics or capabilities.

The cryptographic engine 345 may provide decryption on the request message received by the responder 310 and encryption on the local information to form the reply message sent by the responder 310. It may also provide encryption on the query sent by the collector 320. The cryptographic engine 345 may be optional. It performs decryption and encryption based on a cryptographic procedure established by the query mesh protocol. Any suitable cryptographic procedure may be used. This may include symmetric key techniques such as the Advanced Encryption Standard (AES) and public key techniques such as Diffie-Hellman and Rivest Shamir Adleman (RSA) algorithms.

The collector 320 collects, gathers, and/or receives data, details, and/or information on network, devices, or nodes in the network. The collector 320 includes a query module 330 and a query expander 360. The collector 320 may include more or less than the above components.

The query module 330 queries a node $240_k$ listed in the local route table 335 for node information of the node. The query module 330 may also query a node in the local knowledge base 370. The local route table 335 may contain a list of the neighbor nodes of the node $240_j$ that contains the responder and collector $250_j$. It may also contain the routing information such as the source and destination nodes of a link. The local route table 335 may be updated as the routes change or periodically based on a pre-determined periodicity. The query module 330 may include a query sender 340, and a reply processor 350.

The query sender 340 may interact with the cryptographic engine 345 to encrypt the query (when necessary), the query sender 340 sends a unicast query message containing the encrypted query to the node $240_k$.

The reply processor 350 processes a reply to the unicast query message from the node $240_k$. The reply includes the node information as requested by the query. The node information may include at least one of the capabilities, characteristics, or attributes of the remote node $240_k$ or the network. Since the remote node $240_k$ has the same responding functionality as the responder 310 of the node $240_j$, it also returns the node information having the same information except that the node information pertains to the node $250_k$. The reply processor 350 may wait for a reply time-out period. Thereafter, it may receive the reply as sent by the node $240_k$. It may have a buffer or a queue to buffer the reply. When the query sender 340 sends several queries to several nodes, there may be a number of replies returned from these nodes. The reply processor 350 may maintain a reply time-out period for each node that the query sender 340 sent a query to. A reply time-out period helps the reply processor 350 to determine if a node is responsive to the query. If after the reply time-out period expires and no reply has been received, the reply processor 350 may inform the query sender 340 to re-send the query to that node. The reply time-out period may be dynamically determined based on the estimation of network delay and the hop-distance between the sender and receiver. The retry count for the query sender 340 may be fixed or dynamically selected depending on the network conditions and network topology. When the reply processor 350 receives the reply, it may decrypt the reply if the reply is encrypted using the established cryptographic procedure. From the decrypted reply, the reply processor 350 then extracts the node information of the node $250_k$.

The query expander 360 expands querying to another remote node $240_m$ in the ad hoc home mesh network using the node information of the $240_k$. This new node $240_m$ may be a neighbor of the node $240_k$ and may not be listed in the local route table 335. If this new node is also a neighbor of node $240_j$ and therefore is listed in the local route table 335, it should have been queried by the query module 330 and therefore is not queried again by the query expander 360.

The query expander 360 analyzes the node information as extracted by the reply processor 350 to obtain the neighbor information of the remote node $240_k$. For example, it may scan the list of the list of the neighbor nodes of the remote node $240_k$ and obtain their connectivity status, their name, and/or address. Using the neighbor information of the remote node $240_k$, the query expander 360 may build a local knowledge base 370. The local knowledge base 370 contains information on the network nodes and the network as viewed by the node $240_j$. It may be implemented using any suitable structures such as static arrays or linked list. In building the local knowledge base 370, the query expander 360 may organize the analyzed node information into proper sets and/or subsets, re-arrange the list of the nodes that have been queried or to be queried, resolve any redundancies or conflicts. In particular, the query expander 360 may identify the node $240_m$ as not receiving a duplicate query, such as having been previously queried or about to be queried by the query module 330, to avoid sending a duplicate query. The query expander 360 then sends a next query to the node $240_m$ based on the local knowledge base 370. The query expander 360 may expand querying to the node $240_m$ or any other nodes in the local knowledge base 370 at a periodicity according to an application that the node $240_j$ invokes, or based on a pre-determined frequency as established by the network conditions and/or the query mesh protocol. The local knowledge base 370 may also provide information on the expanded list of the nodes to the query module 330 so that the query module 330 may send out a query. Furthermore, it is noted that although the query module 330 and the query expander 360 are shown as two separate modules or blocks, they may be combined into one. With appropriate flag settings and stopping criteria, a recursive query module may be developed. The query expander 360 may stop expanding when all the nodes in the local route table 335 and the neighbor nodes of all the remote nodes $240_k$'s have been queried and all replies have been received. By that time, the local knowledge base 370 has accumulated sufficient information on the nodes and the network to allow the query expander 360 to construct the global network topology. Any suitable data structures may be used to represent the network topology such as linked list, tree, graph (e.g., using adjacency matrix and adjacency list), etc. The construction or reconstruction of the network topology may be performed by any suitable techniques such as list composition, tree traversal, graph mapping/composition, etc.

Figure 4:
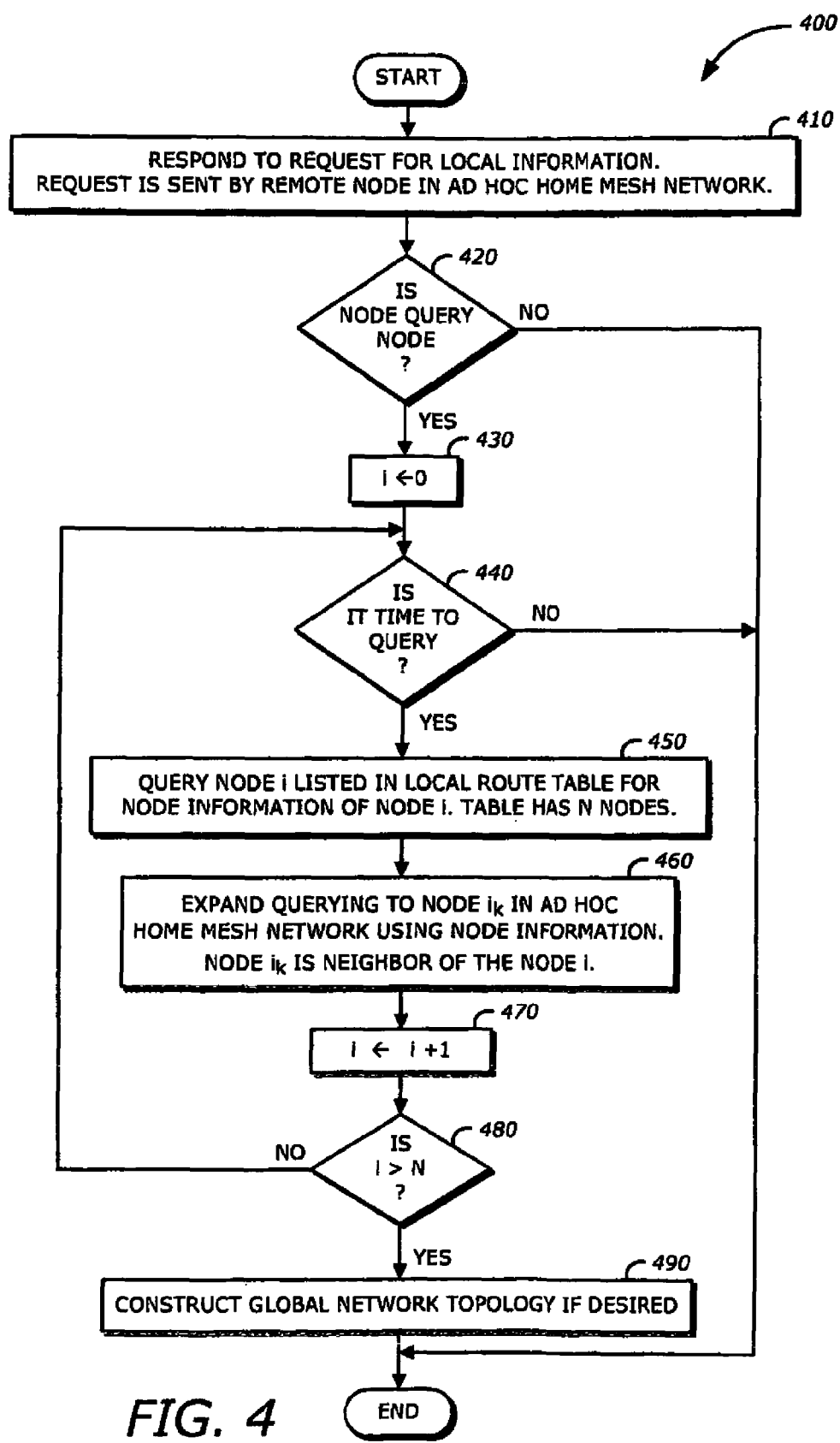
FIG. 4 is a flowchart illustrating a process to respond to request and collect information according to one embodiment.

FIG. 4 is a flowchart illustrating a process 400 to respond to request and collect information according to one embodiment. The process 400 is performed by node j (e.g., node 240j shown in FIG. 2).

Upon START, the process 400 responds to a request for local information (Block 410). The request is sent by a remote node (e.g., node $240_k$ shown in FIG. 2) in an ad hoc home mesh network. The local information is associated with a local route table. Next, the process 400 determines if the node j is the query node (Block 420). If not, the process 400 is terminated. Otherwise, the process 400 initializes the node index i (Block 430). Then, the process 400 determines if it is time to query (Block 440). The frequency or the periodicity of querying may be determined according to the application that node i is invoking. Next, the process 400 queries node i listed in the local route table for node information of the node i (Block 450). The local route table contains N neighbor nodes of node j. Node i is one of neighbor nodes contained in the local route table.

Then, the process 400 expands querying to a node $i_k$ in the ad hoc home mesh network using the node information (Block 460). Node $i_k$ the $k^{th}$ neighbor of node i and is not listed in the local route table. Typically, the process 400 expands querying to the second node at a periodicity according to the application that node j is invoking. Next, the process 400 determines if all nodes in the list have been queried. This may be done by updating the index (e.g., incrementing the index by 1) to go to the next node in the list of the neighbor nodes in the local route table (Block 470) and determining if the node index i exceeds N (Block 480). If the node index does not exceed N, the process 400 returns to block 440. Otherwise, the process 400 constructs a global network topology if desired (Block 490). The construction of the global network topology may be based on the local knowledge base including the replies as received from all the nodes. The process 400 is then terminated. It is contemplated that variations of the process 400 is possible. For example, the expanding of the queries may be performed after all nodes in the list of the local route table have been queried and/or when all replies have been received.

Figure 5:
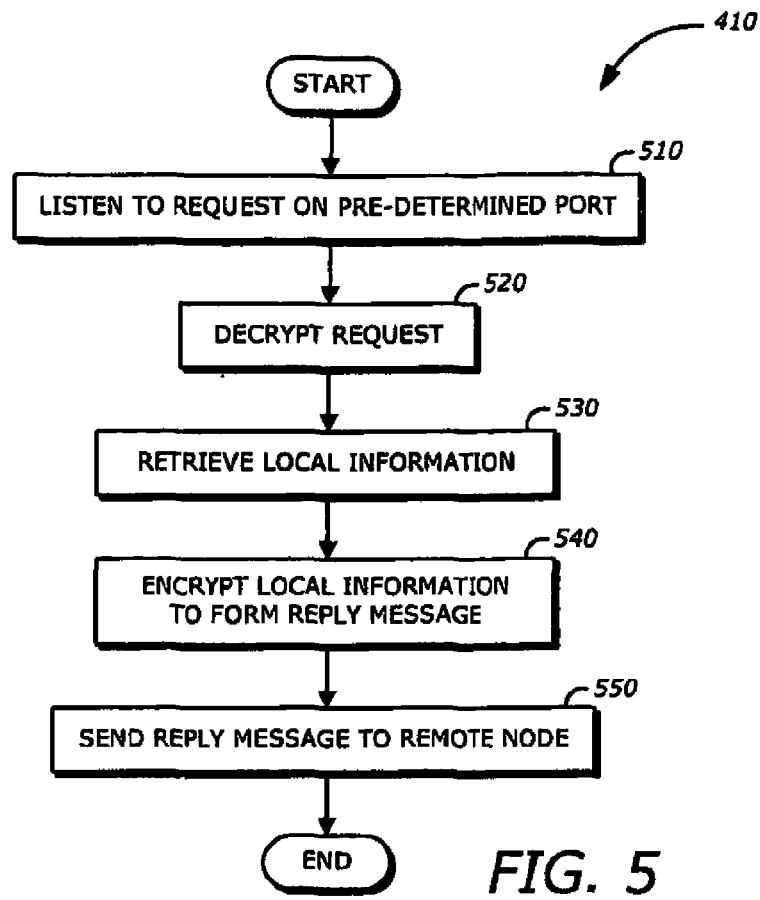
FIG. 5 is a flowchart illustrating a process to respond according to one embodiment.

FIG. 5 is a flowchart illustrating the process 410 shown in FIG. 4 to respond according to one embodiment.

Upon START, the process 410 listens to the request on a pre-determined port (Block 510). Next, the process 410 decrypts the request (Block 520). Then, the process 410 retrieves the local information (Block 530). This may include reading the information from the local information storage 315 (FIG. 3). Then, the process 410 encrypts the local information to form a reply message (Block 540). Next, the process 410 sends the reply message to the remote node (Block 550) and is then terminated.

Figure 6:
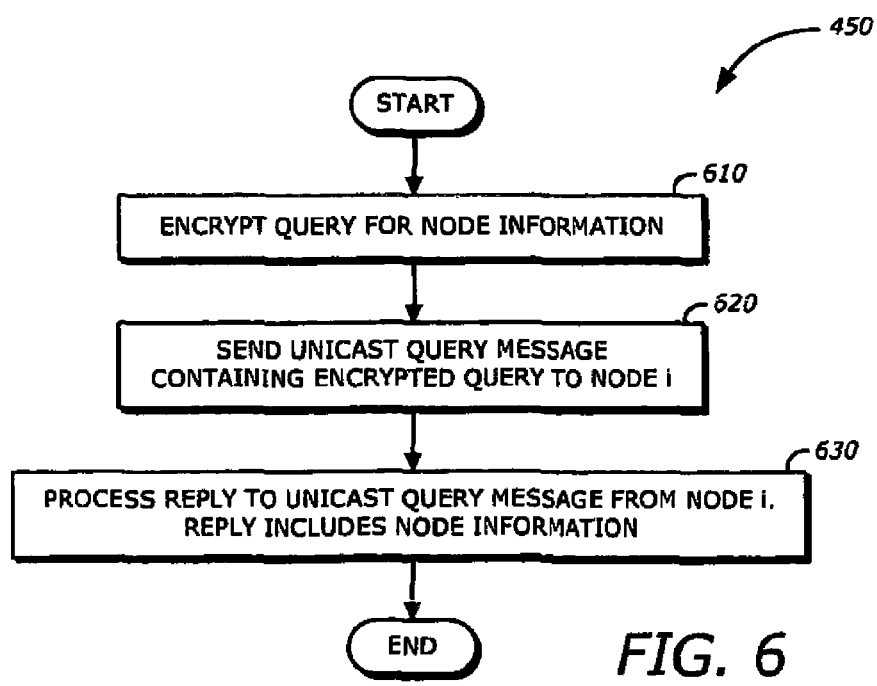
FIG. 6 is a flowchart illustrating a process to query according to one embodiment.

FIG. 6 is a flowchart illustrating the process 450 shown in FIG. 4 to query according to one embodiment.

Upon START, the process 450 encrypts a query for the node information (Block 610) according to a cryptographic procedure established by the query mesh protocol. Next, the process 450 sends a unicast query message containing the encrypted query to the node i (Block 620). Then, the process 450 processes a reply to the unicast query message from node i (Block 630). The reply comes from the remote node (e.g., node $240_k$) and includes the node information. The process 450 is then terminated.

Figure 7:
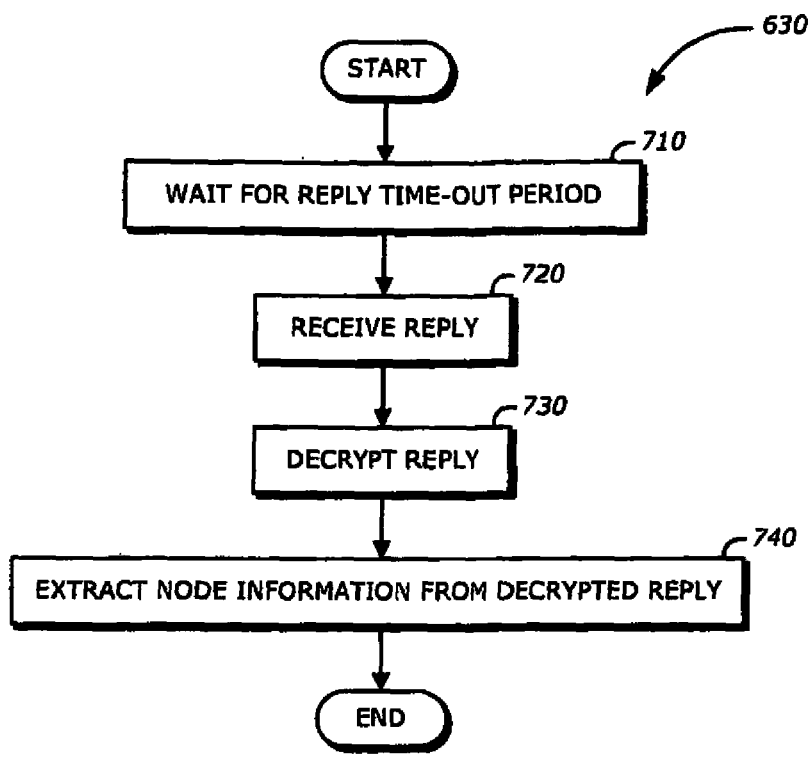
FIG. 7 is a flowchart illustrating a process to process a reply according to one embodiment.

FIG. 7 is a flowchart illustrating the process 630 shown in FIG. 6 to process a reply according to one embodiment.

Upon START, the process 630 waits for a reply time-out period (Block 710). Then, the process 630 receives the reply (Block 720). Next, the process 630 decrypts the reply according to the cryptographic procedure established by the query mesh protocol (Block 730). Then, the process 630 extracts the node information from the decrypted reply (Block 740) and is then terminated.

Figure 8:
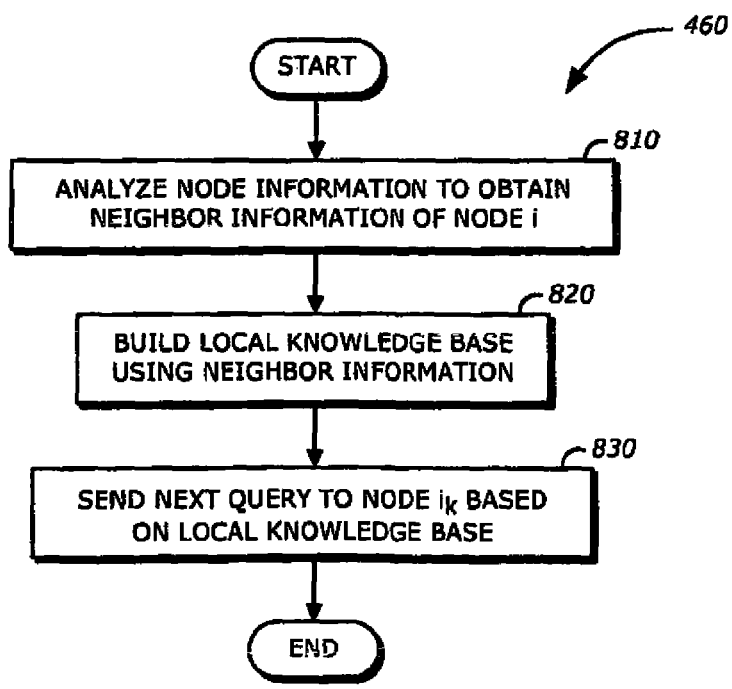
FIG. 8 is a flowchart illustrating a process to expand querying according to one embodiment.

FIG. 8 is a flowchart illustrating the process 460 shown in FIG. 4 to expand querying according to one embodiment.

Upon START, the process 460 analyzes the node information to obtain neighbor information of node i (Block 810). Next, the process 460 builds a local knowledge base using the neighbor information (Block 820). Then, the process 460 sends a next query to the node $i_k$ based on the local knowledge base (Block 830). The process 460 is then terminated.

Figure 9:
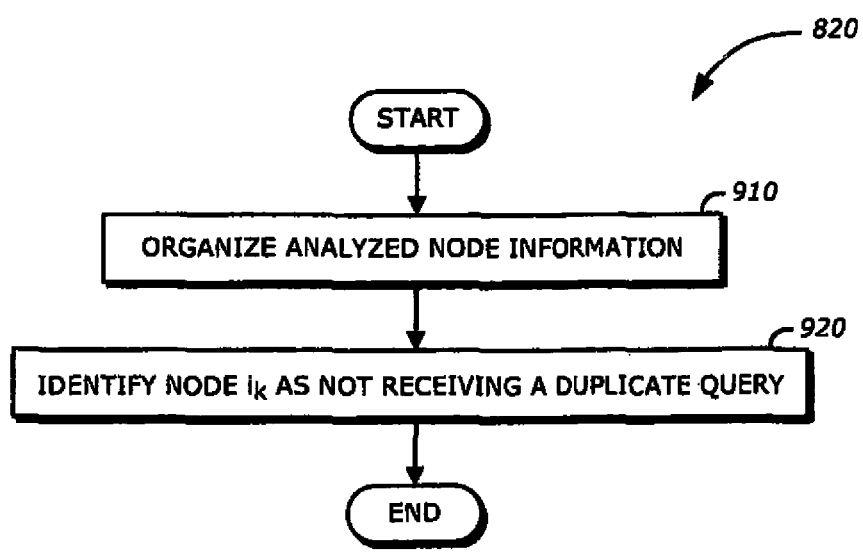
FIG. 9 is a flowchart illustrating a process to build a local knowledge base according to one embodiment.

FIG. 9 is a flowchart illustrating the process 820 shown in FIG. 8 to build the local knowledge base according to one embodiment.

Upon START, the process 820 organizes the analyzed node information (Block 910). This may include extracting fields of node information, re-arranging the list of the nodes to be queried or have been queried. Next, the process 820 identifies node $i_k$ as not receiving a duplicate query (Block 920). This is done to avoid sending a query to a node that has been queried before to avoid duplicating queries. This may include matching the node $i_k$ with the nodes that have been queried or have been included in the list of the nodes to be queried. The process 820 is then terminated.

Figure 10:
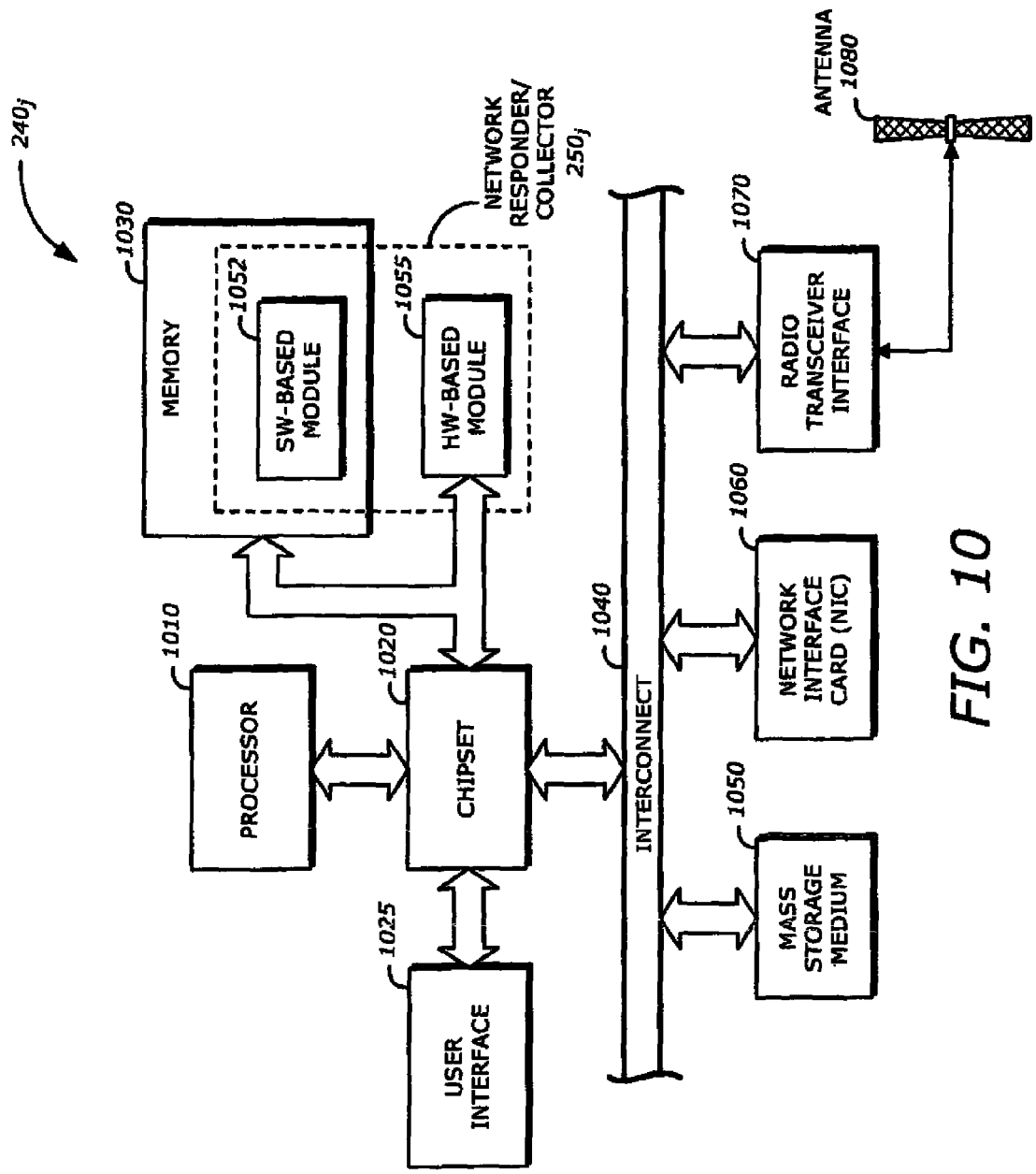
FIG. 10 is a diagram illustrating a node having the network responder and collector according to one embodiment.

FIG. 10 is a diagram illustrating a node $240_j$ having the network responder and collector according to one embodiment. The node $240_j$ may include a processor 1010, a chipset 1020, a user interface 1025, a memory 1030, the network responder and collector $250_j$, an interconnect 1040, a mass storage medium 1050, a network interface card (NIC) 1060, a radio transceiver interface 1070, and an antenna 1080. The node $240_j$ may include more or less than the above components.

The processor 1010 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 1020 provides control and configuration of memory and input/output (I/O) devices such as the user interface 1025, the memory 1030, the mass storage medium 1050, the NIC 1060, and the radio transceiver interface 10700. The chipset 1020 may integrate multiple functionalities such as I/O controls, graphics, media, host-to-peripheral bus interface, memory control, power management, etc. The chipset 1020 may interface to the mass storage device 1050 to store archive information such as code, programs, files, data, and applications.

The network responder and collector $250_j$ responds to requests and collects information as described above. It may include a software (SW)-based module 1052 and a hardware (HW)-based module 1055. It is noted that the network responder and collector 250$_j$ may include more or less than the above components. For example, it may include only the SW-based module 1052 or only the HW-based module 1055. The SW-based module 1052 may include programs, instructions, or functions to carry out part or all of the operations for the network response and information collection. The HW-based module 1055 may include circuits, logic, devices, or firmware components to carry out part or all of the operations for the network response and information collection.

The memory 1030 stores system code and data. The memory 1030 is typically implemented with dynamic random access memory (DRAM), static random access memory (SRAM), or any other types of memories including those that do not need to be refreshed, including read only memory (ROM), flash memories. In one embodiment, the memory 1030 may contain the SW-based module 1052 of the network responder and collector 250$_j$ that performs the functions of responding to requests and querying network and nodes. The user interface 1025 may include circuits and functionalities that provides interface to a user. This may include display control, entry device control, remote control, etc. The entry device or devices may include keyboard, mouse, trackball, pointing device, stylus, or any other appropriate entry device. The display device may be a television (TV) set, a display monitor, or a graphic output device. The display type may include any display type such as high definition TV (HDTV), cathode ray tube (CRT), flat panel display, plasma, liquid crystal display (LCD), etc.

The interconnect 1040 provides an interface for the chipset 1020 to communicate with peripheral devices such as the mass storage medium 1050, the NIC 1060, and the radio transceiver interface 1070. The interconnect 1040 may be point-to-point or connected to multiple devices. For clarity, not all the interconnects are shown. It is contemplated that the interconnect 1040 may include any interconnect or bus such as Peripheral Component Interconnect (PCI), PCI Express, Universal Serial Bus (USB), and Direct Media Interface (DMI), etc.

The mass storage medium 250 may store archive information such as code, programs, files, data, and applications. The mass storage interface may include small system computer interface (SCSI), serial SCSI, Advanced Technology Attachment (ATA) (parallel and/or serial), Integrated Drive Electronics (IDE), enhanced IDE, ATA Packet Interface (ATAPI), etc. The mass storage medium 250 may include compact disk (CD) read-only memory (ROM), memory stick, memory card, smart card, digital video/versatile disc (DVD), floppy drive, hard drive, tape drive, and any other electronic, magnetic or optic storage devices. The mass storage device or medium 250 provides a mechanism to read machine-accessible media. The NIC 260 provides interface to the various network layers in the WHMN such as the TCP/IP layer and the MAC layer. It may include the port 380 in FIG. 3. The radio transceiver interface 1070 may include analog and digital circuits to perform radio communication interface. It is connected to the antenna 1080 to receive and transmit radio frequency (RF) signals. It may include analog and digital circuitries for fast down-conversion, filtering, analog-to-digital conversion, digital-to-analog conversion, up-conversion, wireless LAN interface, frequency multiplexing, etc. In one embodiment, the radio transceiver interface 260 includes circuits to perform multi-channel single radio communication within the frequency ranges provided by the IEE 802.11x standards (e.g., from 2.4 GHz to 5 GHz). This may include fast frequency switching or multiplexing circuit to change the frequencies while switching from one channel to the next channel within the frequency range. The frequency switching function may be implemented with advanced hardware to minimize the delays in tuning the radio operating parameters. The radio circuit may also include capabilities to listen on a certain frequency at a network port (e.g., port 380 in FIG. 3) and detect if there is a request from a remote node.

The antenna 1080 may be any appropriate RF antenna for wireless communication. In one embodiment, the antenna 1080 may be designed to accommodate the frequency ranges as provided by the IEEE 802.11x standards. The frequency range may be tuned to operate from 2.4 GHz to 5 GHz.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, microprogrammed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A device comprising:
   at least one processor;
   at least one computer memory that is not a transitory signal and that comprises instructions executable by the at least one processor for:
   responding to a request for local information, the request being sent by a remote node in a home network;
   querying a first node for node information of the first node, wherein the node information includes a node network capability and a node power attribute; and
   expanding querying to a second node in the home network using the node network capability, the node power attribute, or both the node network capability and node power attribute of the node information, the second node being a neighbor of the first node,
   wherein the node network capability includes at least one of multi-channel capability, Quality of Service (QoS) capability, and QoS priority, wherein the expanding querying comprises:
   analyzing the node information to obtain neighbor information of the first node, and building a local knowledge base using the neighbor information, wherein building the local knowledge base comprises organizing analyzed node information.

2. The device of claim 1 wherein responding comprises:
   retrieving the local information;
   encrypting the local information to form a reply message; and
   sending the reply message to the remote node.

3. The device of claim 1 wherein querying comprises:
   sending a unicast query message containing an encrypted query to the first node; and
   processing a reply to the unicast query message from the first node, the reply including the node information.

4. The device of claim 3 wherein processing the reply comprises:
   waiting for a reply time-out period;
   receiving the reply;
   decrypting the reply; and
   extracting the node information from the decrypted reply.

5. The device of claim 1 wherein expanding querying comprises sending a next query to the second node based on the local knowledge base.

6. The device of claim 5 wherein building the local knowledge base comprises identifying the second node as not having been queried.

7. The device of claim 1 wherein querying the first node comprises querying the first node at a first periodicity according to an application.

8. The device of claim 7 wherein the first periodicity is adjustable.

9. An apparatus comprising:
   a hardware responder circuit configured to respond to a request for local information from a remote node in a network;
   a query module circuit configured to query a first node in the network;
   a query expander circuit coupled to the query module circuit and configured to expand querying to a second node in the network using a node network capability, or a node power attribute, or both the node network capability and the node power attribute, the second node being a neighbor of the first node, node information including the node network capability, or the node power attribute, or both the node network capability and node power attribute; and
   a cryptographic engine coupled to the hardware responder circuit and the query module circuit and configured to decrypt the request or to encrypt a query for the node information according to a cryptographic procedure, wherein the node network capability includes at least one of multi-channel capability, Quality of Service (QoS) capability, QoS priority, wherein the query expander circuit is configured to analyze the node information to obtain neighbor information of the first node, build a local knowledge base using the neighbor information, and send a next query to the second node based on the local knowledge base, wherein the query expander circuit is configured to build the local knowledge base by organizing the analyzed node information and identifying the second node as not having been queried, wherein the query module circuit is configured to query the first node at a first periodicity according to an application.

10. The apparatus of claim 9 wherein the hardware responder circuit is configured to retrieve the local information, encrypt the local information to form a reply message, and send the reply message to the remote node.

11. The apparatus of claim 9 wherein the query modules circuit comprises:
    a query sender circuit configured to send a unicast query message containing the encrypted query to the first node; and
    a reply processor coupled to the query sender circuit and configured to process a reply to the unicast query message from the first node, the reply including the node information.

12. The apparatus of claim 11 wherein the reply processor is configured to wait for a reply time-out period, receive the reply, decrypt the reply, and extract the node information from the decrypted reply.

13. The apparatus of claim 9 wherein the query expander circuit is configured to avoid sending a duplicate query.

14. The apparatus of claim 9 wherein the query expander circuit is configured to expand querying to the second node at a second periodicity according to an application.

15. The apparatus of claim 9 wherein the query expander circuit is configured to construct a global network topology.

* * * * *